2 Sheets—Sheet 1.

W. BRITTAIN & J. SILVERS.
MACHINE FOR PULLING FLAX.

No. 1,020.  
Patented Nov. 25. 1838.

2 Sheets—Sheet 2.

W. BRITTAIN & J. SILVERS.
MACHINE FOR PULLING FLAX.

No. 1,020. Patented Nov. 25, 1838.

UNITED STATES PATENT OFFICE.

WILLIAM BRITTAIN AND JOHN SILVERS, OF HUNTERDON COUNTY, N. J.

MACHINE FOR GATHERING AND PULLING FLAX AND HEMP BY ANIMAL POWER.

Specification forming part of Letters Patent No. 1,020, dated November 25, 1838.

*To all whom it may concern:*

Be it known that we, WILLIAM BRITTAIN and JOHN SILVERS, of the county of Hunterdon, in the State of New Jersey, have invented a new and useful Machine for the Purpose of Pulling or Gathering Flax, Hemp, or other Vegetable Matters from the Ground by the Application of Animal Power thereto; and we do hereby declare that the following is a full and exact description thereof.

This machine consists of a carriage having four wheels, upon which there is a drum revolving on a vertical axle receiving its motion from gearing connected with the carriage-wheels, and being in part surrounded by bands or lines, between which and the drums the plants are to be embraced and pulled from the ground as the carriage advances.

Figure 1:
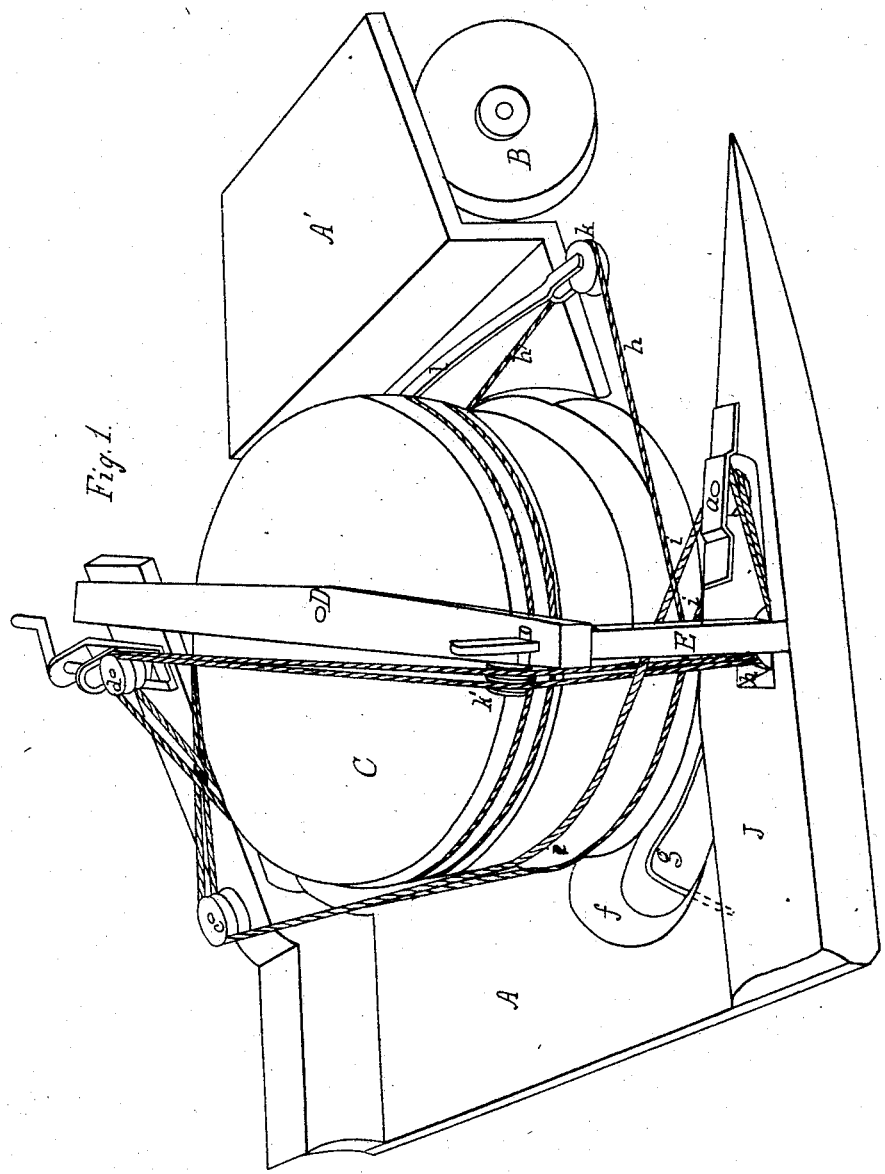
Figure 2:
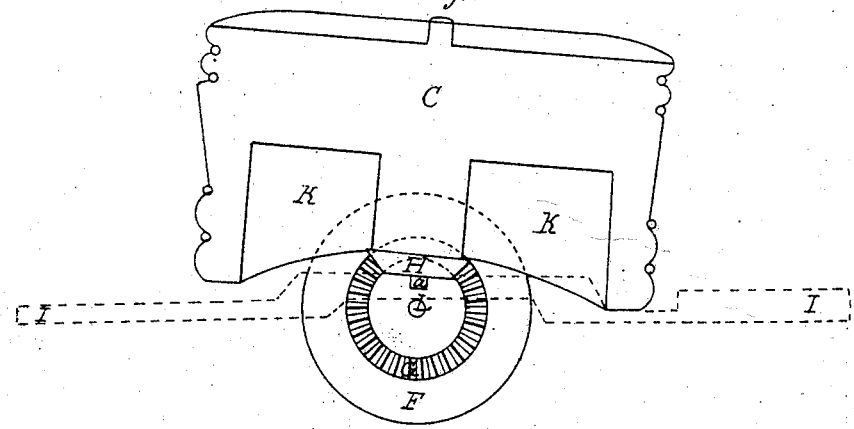

Figure 1 in the accompanying drawings is a perspective view of the machine. Fig. 2 is a vertical section through the drum, showing the manner in which it is geared to the axle; and Fig. 3, a view of the under side of the machine.

In Fig. 1, A A' is the bed of the carriage; B, one of the fore wheels, to the axle of which the shafts are attached by which the horse draws. The front A' of the carriage is represented as elevated and covering the fore wheels, constituting a seat for the driver. C is the revolving drum, having grooves on its periphery to receive the bands or lines between which and the drum the plants are to be embraced. These pulling-bands surround the drum in part only, being conducted off by pulleys in a way to be presently described. The drum C revolves on gudgeons, the uppermost of which is in the middle of the cross-piece D, which is sustained by an upright, E, at each end framed into the carriage.

The lower gudgeon, $a'$, Fig. 2, has its step in the upper side of the carriage. (Represented by the dotted lines I I.) The under side of the drum is hollowed out, as shown at K K, to admit one of the carriage-wheels, F, on the hind axle, L. The other wheel of this axle is shown at F'. Upon it also is a bevel-wheel, G, which gears into a bevel-wheel, H, attached to the drum.

Figure 3:
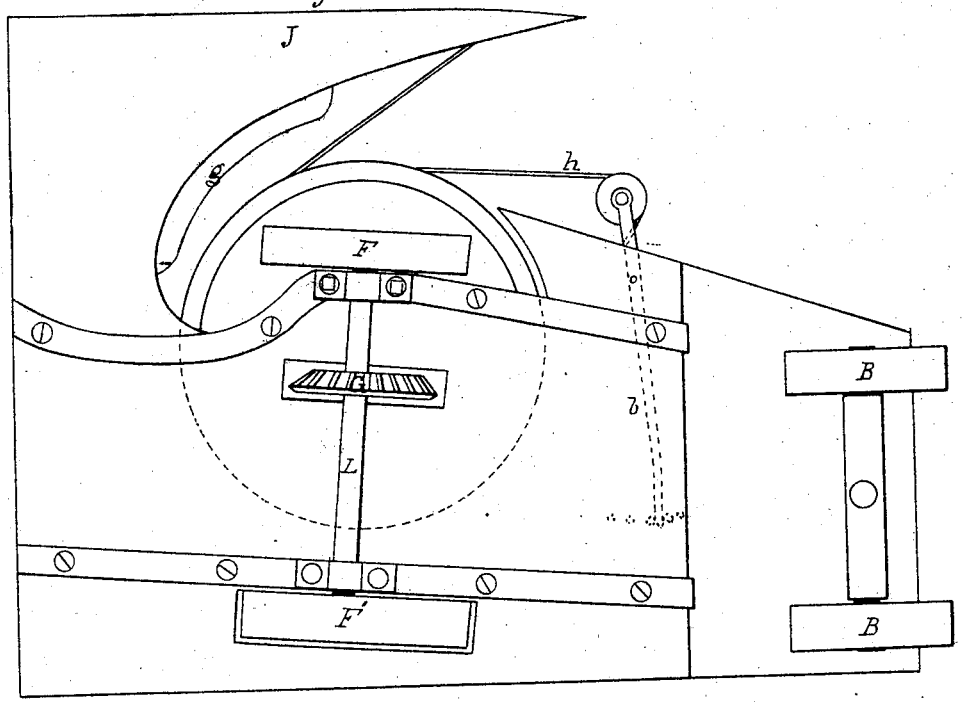

J J, Figs. 1 and 3, is a gathering piece or arm, pointed at its fore end and firmly attached to the other part of the carriage at its rear end. Between its point and the fore end of the carriage there is a space of from fourteen to twenty inches, within which is to be collected the plants to be pulled.

The band $h$ $h$, Fig. 1, passes around the small pulley $k$ and the lower groove of the drum. This pulley is attached to an arm, $l$, working on a pivot, and thus admitting of the tightening of the band. This band, in conjunction with the arm J, conducts the plants to the embracing-band $i$ $i$, between which and the drum C they are to be held until they are pulled from the ground, requiring a distance of about one-fourth of the circumference of the drum. This band is double, embracing the plants between the two portions thereof and the two lower grooves of the drum. There is a double pulley at $a$, to which the band is conducted by a double pulley at $b$. From the pulleys at $a$ the bands pass to the part $e$ of the drum around the two grooves, embracing the plants which have been conducted in between J and $h$. At $f$ the opening terminates, and against this termination the plants are drawn, and are thereby pulled out of the ground.

$g$ is a spring-rod, attached to J at its forward end, and sliding into a hole (shown by the dotted lines) at its rear end, to aid in pressing the lower parts of the plants against the drum, thus gathering them more compactly under the lower band. At the point $e$ of the drum the double band is led off by the double pulley $c$ and the plants fall on the platform A of the carriage, where they are gathered and bound by a hand stationed there for that purpose. From the pulleys $c$ the bands pass around the two upper grooves of the drum, going round nearly its entire circumference, after which they pass round the tightening-pulleys $d$, thence to the pulleys $k'$, attached to the cross-piece D, and from them down to $d$. The arrangement of these pulleys may admit of some variation; but we have given that which we have used and have found to answer well in practice. The important point in its arrangement is the causing it to embrace the plants in the manner described, and to conduct it round in such a manner as shall enable it to do so, and perform its circuit uninterruptedly.

What we claim as our invention, and desire to secure by Letters Patent, is—

The constructing and using a machine for gathering and pulling hemp and flax substantially in the manner set forth—that is to say, a machine which as it is drawn forward embraces the plants between a revolving drum and bands, by which they are pulled out of the ground and deposited on a suitable platform, in the manner described.

WILLIAM BRITTAIN.
JOHN SILVERS.

Witnesses:
LINTON THORN,
D. K. MORSELL.